United States Patent
Berning et al.

(10) Patent No.: US 9,840,816 B2
(45) Date of Patent: Dec. 12, 2017

(54) CONSTRUCTION MACHINE, AS WELL AS METHOD FOR MILLING OFF AND TRANSPORTING AWAY A MILLED-OFF STREAM OF MATERIAL OF A CONSTRUCTION MACHINE

(71) Applicant: Wirtgen GmbH, Windhagen (DE)

(72) Inventors: Christian Berning, Bruehl (DE);
Cyrus Barimani, Konigswinter (DE);
Martin Hömig, Leubsdorf / Rhein (DE)

(73) Assignee: Wirtgen GmbH (DE)

( * ) Notice: Subject to any disclaimer, the term of this patent is extended or adjusted under 35 U.S.C. 154(b) by 141 days.

(21) Appl. No.: 14/567,045

(22) Filed: Dec. 11, 2014

(65) Prior Publication Data
US 2015/0176230 A1    Jun. 25, 2015

(30) Foreign Application Priority Data
Dec. 20, 2013    (DE) .................. 10 2013 226 981

(51) Int. Cl.
*E01C 23/088*    (2006.01)
*E01C 23/12*    (2006.01)
*B65G 15/16*    (2006.01)

(52) U.S. Cl.
CPC .......... *E01C 23/088* (2013.01); *E01C 23/127* (2013.01); *B65G 15/16* (2013.01)

(58) Field of Classification Search
CPC .................................................. E01C 23/127
See application file for complete search history.

(56) References Cited

U.S. PATENT DOCUMENTS

| 3,362,460 A | 1/1968 | Ligh |
| 3,799,479 A | 3/1974 | Roeder et al. |

(Continued)

FOREIGN PATENT DOCUMENTS

| CA | 1220753 A | 4/1987 |
| DE | 2228395 | 12/1973 |

(Continued)

OTHER PUBLICATIONS

European Search Report in corresponding European Patent Application EP 14193829, dated Apr. 22, 2015, 3 pp. (not prior art).

*Primary Examiner* — David Bagnell
*Assistant Examiner* — Michael Goodwin
(74) *Attorney, Agent, or Firm* — Lucian Wayne Beavers; Patterson Intellectual Property Law, PC (57) ABSTRACT

In a self-propelled construction machine, in particular cold milling machine, recycler or surface miner, for working ground surfaces, comprising a milling drum supported at a machine frame and a conveying device arranged at the machine frame which accepts the milled-off material from the milling drum during the working operation and, on a continuously revolving first transport belt, unloads it, in conveying direction, onto a point of discharge at a discharge end along a parabolic trajectory, it is provided for the following features to be achieved: as a minimum, the last section of the conveying device as seen in conveying direction comprises no less than one continuously revolving cover belt arranged above the transport belt, said cover belt extending essentially parallel to the transport belt and resting against the milled-off material on the transport belt at least in a partial section of the length of the transport belt.

22 Claims, 4 Drawing Sheets

(56) References Cited

U.S. PATENT DOCUMENTS

| | | | |
|---|---|---|---|
| 4,063,375 A | 12/1977 | Satterwhite | |
| 4,183,158 A | 1/1980 | Satterwhite | |
| 4,427,105 A | 1/1984 | Hawley et al. | |
| 4,561,537 A * | 12/1985 | Dos Santos | B65G 15/16 198/626.4 |
| 4,565,281 A * | 1/1986 | Kramer | B65G 15/16 198/311 |
| 4,566,586 A * | 1/1986 | Robertson | B65G 15/16 198/626.4 |
| 4,591,432 A | 5/1986 | Hartl | |
| 4,618,057 A | 10/1986 | Howser | |
| 4,723,867 A | 2/1988 | Wirtgen | |
| 4,753,296 A | 6/1988 | Kruithoff | |
| 4,756,402 A | 7/1988 | Bevins | |
| 4,775,047 A | 10/1988 | Grall | |
| 4,843,799 A | 7/1989 | Simelunas et al. | |
| 4,923,359 A | 5/1990 | Petri et al. | |
| 4,951,806 A | 8/1990 | Schwing et al. | |
| 5,086,911 A | 2/1992 | Douglas | |
| 5,161,670 A | 11/1992 | David | |
| 5,299,674 A | 4/1994 | Cusitar | |
| 5,360,097 A | 11/1994 | Hibbs | |
| 5,443,351 A | 8/1995 | Pettijohn | |
| 5,460,260 A | 10/1995 | Ochs et al. | |
| 5,569,013 A | 10/1996 | Evans et al. | |
| 5,850,903 A | 12/1998 | Walters | |
| 5,875,883 A | 3/1999 | Ertel et al. | |
| 6,006,893 A | 12/1999 | Gilmore et al. | |
| 6,085,894 A | 7/2000 | Bedford | |
| 6,264,022 B1 * | 7/2001 | Petack | B65G 15/16 198/626.4 |
| 6,296,109 B1 | 10/2001 | Nohl | |
| 6,491,489 B1 | 12/2002 | Stragier | |
| 6,508,153 B1 | 1/2003 | Lumberg et al. | |
| 6,640,962 B2 | 11/2003 | Richardson | |
| 6,889,615 B2 | 5/2005 | Johnson et al. | |
| 6,966,418 B2 | 11/2005 | Crookston | |
| 7,153,086 B2 | 12/2006 | Kauppila et al. | |
| 7,347,311 B2 | 3/2008 | Rudge | |
| 7,472,785 B2 | 1/2009 | Albright et al. | |
| 7,784,400 B2 | 8/2010 | Simmons | |
| 7,802,975 B2 | 9/2010 | Currie et al. | |
| 8,424,666 B2 | 4/2013 | Berning et al. | |
| 8,770,386 B2 | 7/2014 | Berning et al. | |
| 2004/0118663 A1 | 6/2004 | Gaeddert et al. | |
| 2009/0158524 A1 | 6/2009 | Patterson et al. | |
| 2009/0217793 A1 | 9/2009 | Spillner et al. | |
| 2009/0267402 A1 * | 10/2009 | Berning | E01C 23/088 299/39.4 |
| 2010/0012688 A1 | 1/2010 | Sakane et al. | |
| 2010/0162676 A1 | 7/2010 | Simmons | |
| 2010/0290879 A1 | 11/2010 | Ricketts et al. | |
| 2012/0285711 A1 | 11/2012 | Sato et al. | |
| 2013/0011230 A1 | 1/2013 | Barry | |

FOREIGN PATENT DOCUMENTS

| | | |
|---|---|---|
| DE | 203885 | 11/1983 |
| DE | 3429940 A1 | 2/1985 |
| DE | 3528038 A1 | 2/1987 |
| EP | 0249084 B1 | 1/1990 |
| EP | 0731040 A1 | 9/1996 |
| EP | 1864921 A1 | 12/2007 |
| EP | 2113613 A1 | 11/2009 |
| GB | 1417281 A | 12/1975 |

* cited by examiner

CONSTRUCTION MACHINE, AS WELL AS METHOD FOR MILLING OFF AND TRANSPORTING AWAY A MILLED-OFF STREAM OF MATERIAL OF A CONSTRUCTION MACHINE

BACKGROUND OF THE INVENTION

1. Field of the Invention

The invention relates to a self-propelled construction machine, in particular cold milling machine, recycler, surface miner, and to a method for milling off and transporting away a milled-off stream of material.

2. Description of the Prior Art

When removing ground or road material using a road milling machine, milled material is produced that is loaded onto a transport vehicle by the road milling machine by means of a conveying device. In this arrangement, the conveying device may comprise one or multiple transport belts which accept the material from the milling drum and unload it at a discharge end along a parabolic discharge trajectory. Loading of the milled material is effected in operation, that is, while the road milling machine and the transport vehicle are in motion. In the process, it is of significance to transfer the milled material onto the transport vehicle in a controlled fashion as the milled-off material is otherwise not unloaded to a specified point of discharge and may impair the traffic flowing alongside or, if the milled material does not entirely come down on the loading surface of the transport vehicle, causes additional sweeping operations.

To guide the stream of material, at least the last section of the conveying device as seen in conveying direction may preferably be mounted to pivot laterally and/or in height, in which case the parabolic trajectory can additionally be influenced by means of the adjustment of the conveying speed.

The properties of the milled-off material differ depending on the task to be performed, for example, fine milling or the removal of complete road pavements, as well as on the operating parameters adjusted, for example, the advance speed of the road milling machine, the milling depth and the type of the milled-off material.

The quantity of the material milled off per unit of time, as well as the composition of the same and the size of the fragments of milled material, in particular, may differ.

It is generally known to load the milled-off material onto a transport vehicle by means of one or multiple successive transport belts.

With steep-incline conveyors, it is also known to use a double-belt belt conveyor (EP 0 249 084).

With the simple transport belts known from road milling machines, a discontinuous stream of material may form as a result of the inhomogeneity of the milled material and the changing quantity of the milled material.

This is due to the fact that, depending on the size of the fragments of the milled-off material, a relative movement of the fragments among themselves and to the transport belt may result, namely, in particular if there is very much or very little milled-off material on the transport belt, or in the case of slab-like fragments of the milled-off material.

A fluctuating amount of slip may form between the milled-off material and the transport belt, namely, in particular in the case of a high speed of the transport belt. As a consequence, different discharge speeds of individual components of the milled-off material may occur, in which case, in addition, flight paths of the different fragments of the milled-off material deviating from the specified parabolic trajectory may result. A further consequence is that, in the mean, the effective discharge speed is lower than the speed of the transport belt which results in a loss of energy.

In addition, a decelerated stream of material is more vulnerable to exterior influences, such as wind loads acting transverse to the transport belt, as the kinematic energy is reduced in conveying direction.

SUMMARY OF THE INVENTION

It is therefore the object of the invention to specify a construction machine, as well as a method for milling off and transporting away a milled-off stream of material of a construction machine, in which the discharge of the milled-off material can be computed in an improved fashion and adjusted with a higher level of reproducibility.

One embodiment advantageously provides for, as a minimum, the last section of the conveying device as seen in conveying direction to comprise no less than one continuously revolving cover belt arranged above the transport belt, said cover belt extending essentially parallel to the transport belt and resting against the milled-off material on the transport belt at least in a partial section of the length of the transport belt.

The following advantages may be provided:

By arranging no less than one cover belt above the transport belt, the form and direction as well as bundling of the stream of material can be adjusted more precisely. Altogether, a higher and more homogeneous discharge speed of the milled-off material as well as a more precise adjustment of the discharge speed can be achieved, especially since an improved transmission of force from the transport belt to the milled-off material can be effected in the sense of a lower amount of slip occurring.

Lateral sealings, which were needed up to now and generated friction losses at the transport belt, are avoided as the sealing is now ensured by the overlying cover belt. Overall, an improved energy performance ensues, it being possible to reduce the fuel consumption and to better comply with legal requirements also in terms of pollutant emission.

In a preferred embodiment, it is intended for the conveying device or the last section of the conveying device to be arranged to pivot at the machine frame in terms of inclination and/or lateral alignment.

The cover belt is preferably pre-tensionable resiliently in the direction towards the transport belt. In this arrangement, the contact force may also be generated by the own weight of the cover belt.

In a preferred embodiment, it is intended for the cover belt to be adjustable in height and/or to be supported in a pre-tensionable fashion in the direction towards the transport belt. Being supported resiliently enables a part of the weight of the cover belt to be compensated for, or the initial tension vis-à-vis the weight load to even be increased, or also just the lower strand to be pressed against the milled-off material on the transport belt dynamically.

In a further development of the invention, it is intended for the transport belt to be of foldable design, with a front section of the transport belt, or a last section as seen in conveying direction, being pivotable downwards when in a transport position. For this purpose, the cover belt may preferably be of a divided design so that a total of two cover belts arranged behind one another are arranged above the transport belt. In this arrangement, the last cover belt as seen in the direction of transport is foldable preferably downwards together with the front section of the transport belt. The transport length of a road milling machine can thus be reduced significantly.

The cover belt may also be arranged in the area of the foldable front section of the transport belt only.

In a preferred embodiment, it is intended for the transport belt to comprise support rollers for the upper and lower strands, and for the support rollers for the upper strand of the transport belt, in a plane extending orthogonal to the conveying direction, to form a transport channel with a concave cross-section on the upper strand of the transport belt.

According to a further development, it is intended for the cover belt to comprise support rollers for the upper and lower strands of the cover belt, and for the support rollers for the lower strand of the cover belt, in a plane extending orthogonal to the conveying direction, to allow flexible adjustment of the cross-sectional shape of the lower strand of the cover belt to the quantity of milled material present on the transport belt. Flexible adjustment of the cross-sectional shape of the lower strand to the quantity of milled material present on the transport belt is effected dynamically at each position of arrangement of the support rollers.

It is preferably intended for articulated support rollers of the lower strand of the cover belt to be pre-tensionable resiliently in the direction towards the first transport belt. To this effect, as a minimum, the support rollers for the upper strand of the transport belt and the support rollers for the lower strand of the cover belt may comprise multiple roller segments coupled to one another in an articulated fashion. In this arrangement, the segments of the upper strand of the transport belt are preferably supported in a fixed position while the support rollers for the lower strand of the cover belt are supported in a movable fashion so that the individual roller segments can assume different angular positions relative to one another.

Alternatively, it is also possible for the support rollers for the lower strand of the cover belt to be provided in a V-shaped dual arrangement behind one another as seen in conveying direction.

The conveying speed of the belts, namely of the transport belt and no less than one cover belt, may be variable and/or adjustable individually.

The no less than one cover belt may, in the area of the discharge end in front of the end of the transport belt, diverge from the same.

The no less than one cover belt may, in the area of the discharge end, protrude beyond the end of the transport belt as seen in conveying direction.

In one embodiment, it may be intended for the cover belt, at the discharge end, to project vis-à-vis the transport belt as seen in the direction of transport and for the projecting part of the cover belt to be pivotable, relative to the transport belt, about an axis extending transverse and parallel to the transport belt or to be guided about the end of the transport belt in the shape of an arc. The pivotability of the projecting part of the cover belt makes it possible to influence the parabolic discharge trajectory of the milled-off stream of material.

In such an embodiment in which, for example, the lower strand of the cover belt is guided about the end of the transport belt in the shape of an arc, there is the possibility for the last deflection roller of the cover belt to be moved from a position in which the lower strand of the cover belt surrounds the end of the transport belt in the shape of an arc, for example, in an angular range of approx. 90°, into a position in which the last deflection roller as seen in the direction of transport is located in a rectilinear extension of the cover belt.

Depending on the position of said deflection roller, the parabolic trajectory can be changed so as to enable adjustment of the point of impingement of the milled-off material on a loading surface of a transport vehicle.

It may be intended for the belts to comprise an essentially rectilinear deflection roller each on the inlet side and outlet side, and for no less than one of the last deflection rollers as seen in conveying direction to be pivotable relative to the respective opposite deflection roller. The adjustability of the deflection rollers at the discharge end enables the stream of material to be bundled more strongly, should the need arise, and the parabolic trajectory to be shortened, where appropriate, despite a high conveying speed so that the point of discharge is moved closer to the conveying device.

In a method for milling off and transporting away a milled-off stream of material of a road milling machine, it is intended for the milled-off material to be transported, at least on a part of the length of the transport belt, between a transport belt and no less than one upper cover belt of the conveying device.

In the process, the cover belt may be pre-tensioned resiliently in the direction towards the lower transport belt carrying the milled-off material at least in that part which is in contact with the milled-off material.

The milled-off material may be transported in a transport channel of the lower transport belt, in which process the lower strand of the upper cover belt is guided in such a fashion that the strand, which has a convex to concave cross-sectional shape depending on the quantity of the milled-off material, is pressed against the milled-off material.

The belts accepting the milled-off material between themselves may be guided in a converging fashion on the inlet side and/or in a diverging fashion on the outlet side.

In the following, embodiments of the invention are explained in more detail with reference to the drawings.

BRIEF DESCRIPTION OF THE DRAWINGS

The following is shown:
FIG. 1 a road milling machine,
FIG. 2 a section through the conveying device according to FIG. 1 in a longitudinal median plane,
FIG. 3 a section along line III-III in FIG. 2,
FIG. 4 a section according to FIG. 3 with loaded transport belt,
FIG. 5 a side view of the conveying device in folded state,
FIG. 6 an alternative design of the support rollers for the upper strand of the transport belt, and
FIG. 7 an embodiment with a projecting and pivotable cover belt.

DETAILED DESCRIPTION

Figure 1:
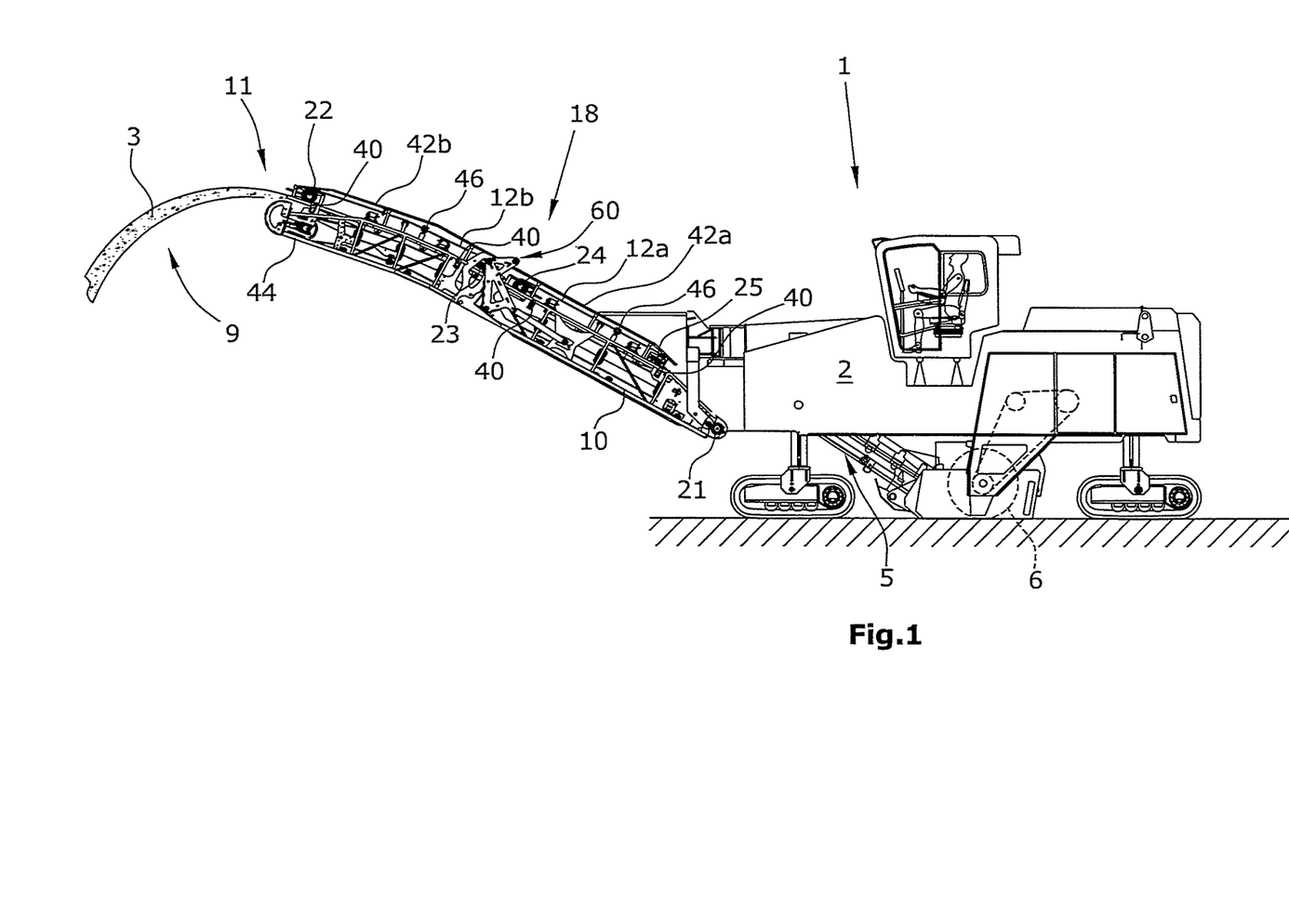

FIG. 1 shows a construction machine 1 for milling ground surfaces or traffic surfaces which is also referred to as a cold milling machine.

The cold milling machine features a chassis comprising, for example, four crawler track units, said chassis supporting the machine frame 2 of the road milling machine 1. It is understood that the crawler track units may be substituted, wholly or in part, by wheels.

A milling drum 6 extending transversely to the direction of travel is mounted in the machine frame 2. The milling depth is preferably set by means of the height adjustment of the crawler track units via lifting columns. The cold milling machine depicted in FIG. 1 is also referred to as a front-loading road milling machine as it is capable of conveying the milled-off material 3 towards the front as seen in the direction of travel onto a point of discharge on a transport vehicle. A first transport belt 5 of a conveying device 18 is arranged in front of the milling drum 6 as seen in the direction of travel, said first transport belt 5 preferably transferring the milled-off material 3 to a second transport belt 10. It is understood that the road milling machine 1 may also comprise a single transport belt only which may also be arranged at the rear of the road milling machine 1.

The cold milling machine depicted in FIG. 1 shows a typical embodiment of a construction machine which also allows the use of a folding conveying device 18. A foldable transport belt is generally already known from EP 2 113 613 A1. (U.S. Pat. No. 8,424,666)

Figure 2:
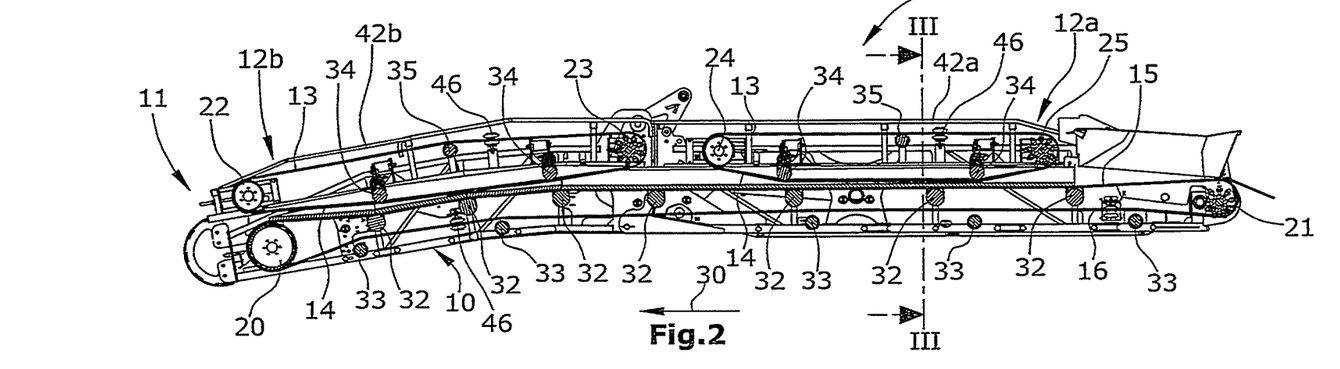

FIG. 2 shows a partial section through the longitudinal median plane of the conveying device 18 which comprises a lower transport belt 10 and two successive upper cover belts 12a, 12b. No less than one cover belt 12a, 12b is arranged above the transport belt 10 of the conveying device 18 so that, notwithstanding the embodiments shown in the figures, a single cover belt 12 only may also be arranged above the transport belt 10.

The transport and cover belts 10, 12a, 12b are continuously revolving belts which revolve about essentially rectilinear deflection rollers 20 to 25, where the front deflection rollers 20, 22, 24 as seen in conveying direction 30 may preferably be driven deflection rollers, and where the rear deflection rollers 21, 23, 25 as seen in conveying direction 30 may also be of spherical design.

The belts 10, 12a, 12b each comprise an upper strand 13, 15 and a lower strand 14, 16, in which arrangement the lower strand 14 of the single cover belt or the cover belts 12a, 12b may be pre-tensioned in the direction towards the upper strand 15 of the transport belt 10.

Altogether, the no less than one cover belt 12a, 12b may be adjustable in height relative to the transport belt 10. To this effect, the conveying device 18 comprises a frame 44 for the transport belt 10 and frames 42a, 42b for the cover belts 12a, 12b, with guiding elements 40 being intended at the sides of said frames which enable the no less than one cover belt 12a, 12b to be adjusted in height relative to the transport belt 10.

In this arrangement, the cover belts 12a, 12b, with their lower strands 14 each, may rest, due to their own weight, on the transport belt 10 or on the milled-off material 3 transported on the transport belt 10.

The lateral guiding devices 40 (FIG. 1 and FIG. 5), which are arranged on both sides of the cover and transport belts 10, 12a, 12b, may be combined with spring devices so that the cover belts 12a, 12b do not rest on the upper strand 15 of the transport belt 10 with their full weight.

It goes without saying that the guiding devices 40 may also be adjusted so as to enable a specific permanent distance to be preset between the frames 42a, 42b, 44 of the transport and cover belts 10, 12a 12b.

The guiding elements 40 may alternatively also be combined with spring elements which pre-tension the frame 42a, 42b of the no less than one cover belt 12a, 12b downwards. As can best be inferred from FIGS. 3 and 4, which represent a section along line III-III in FIG. 2, support rollers 32 are preferably intended for the upper strand 15 of the transport belt 10, with the roller segments 32a, 32b, 32c of said support rollers 32 being connected to one another in an articulated fashion and, together with the upper strand 15, creating a bed of concave cross-section for the milled-off material 3. In this design, the support rollers 32 are preferably arranged in a fixed position in the frame 44.

Figure 3:
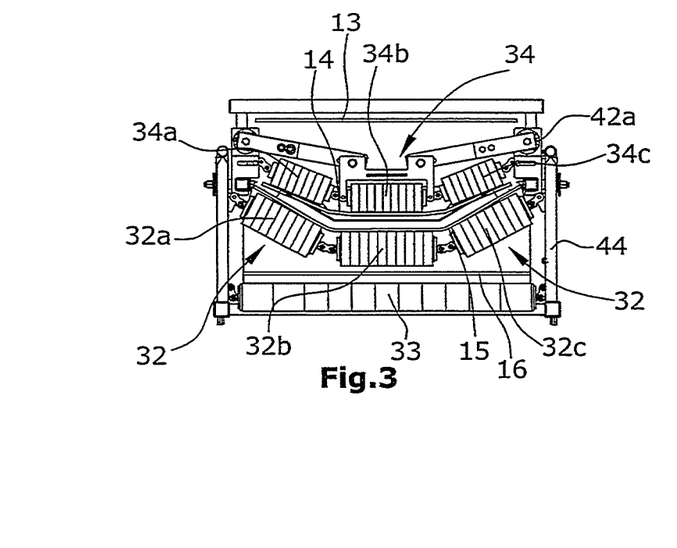
Figure 4:
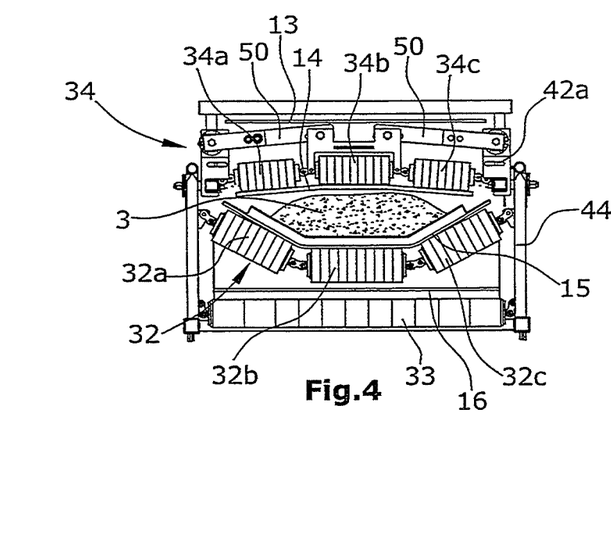

The lower strand 14 of the no less than one cover belt 12a, 12b comprises movable support rollers 34 which may also be segmented and are connected to one another in an articulated fashion such that they can change from a lowest position with minimal loading of the transport belt 10, as shown in FIG. 3, to a position in loaded state of the transport belt 10, as shown in FIG. 4. A gear, for example, is intended to this effect which guides the support rollers 34 in an essentially orthogonal plane to the cover belt 12a and 12b respectively. In this arrangement, each support roller 34 is comprised of, for example, three roller segments 34a, 34b, 34c, with all roller segments being guided in the orthogonal plane by, for example, a four-link mechanism 50 at the frame 42a, 42b.

The support rollers 34 for the lower strand 14 of the cover belt 12a or 12b respectively may be pre-tensioned against the lower strand 14 by means of spring elements, for example, Rosta-Blocks.

The upper support rollers 35 of the no less than one cover belt 12a, 12b and the lower support rollers 33 of the transport belt 10 may be rectilinear rollers which are supported in a fixed position relative to the frames 42a, 42b, 44.

Furthermore, the transport or cover belts 10, 12a, 12b, respectively may comprise lateral guiding devices 46 which are arranged at the upper strand 13 of the no less than one cover belt and at the lower strand 16 of the transport belt respectively in a specific height position relative to the frames 42a, 42b, 44 in order to ensure a lateral guidance. The cover belts 12a, 12b are guided, on the inlet side, between the deflection rollers 23, 25 and the first support roller 34 in a converging fashion to the transport belt 10 while, on the outlet side, they are guided in a diverging fashion in the direction towards the front deflection rollers 22, 24 as seen in conveying direction 30.

In this design, the front deflection roller 22 as seen in conveying direction 30 of the last cover belt 12b as seen in conveying direction 30 may be arranged to pivot relative to the deflection roller 20 of the transport belt 10 so that the direction of discharge of the milled-off material 3 between the transport belt 10 and the no less than one last cover belt 12b can be adjusted in different ways. Alternatively the deflection roller 20 of the transport belt or both deflection rollers 20, 22 can be pivotable.

The upper strand 15 of the transport belt 10 and the lower strand 14 of the no less than one cover belt 12a, 12b, respectively move, in conveying direction 30, with the same, preferably adjustable conveying speed or with an adjustable different conveying speed. The shape of the parabolic trajectory 9 at the discharge end 11 can be influenced by means of the conveying speed and the height adjustment of the conveying device 18, as well as by means of the adjustment of the distance or the pivoting angle, respectively between the last cover belt 12b and the transport belt 10.

Figure 5:
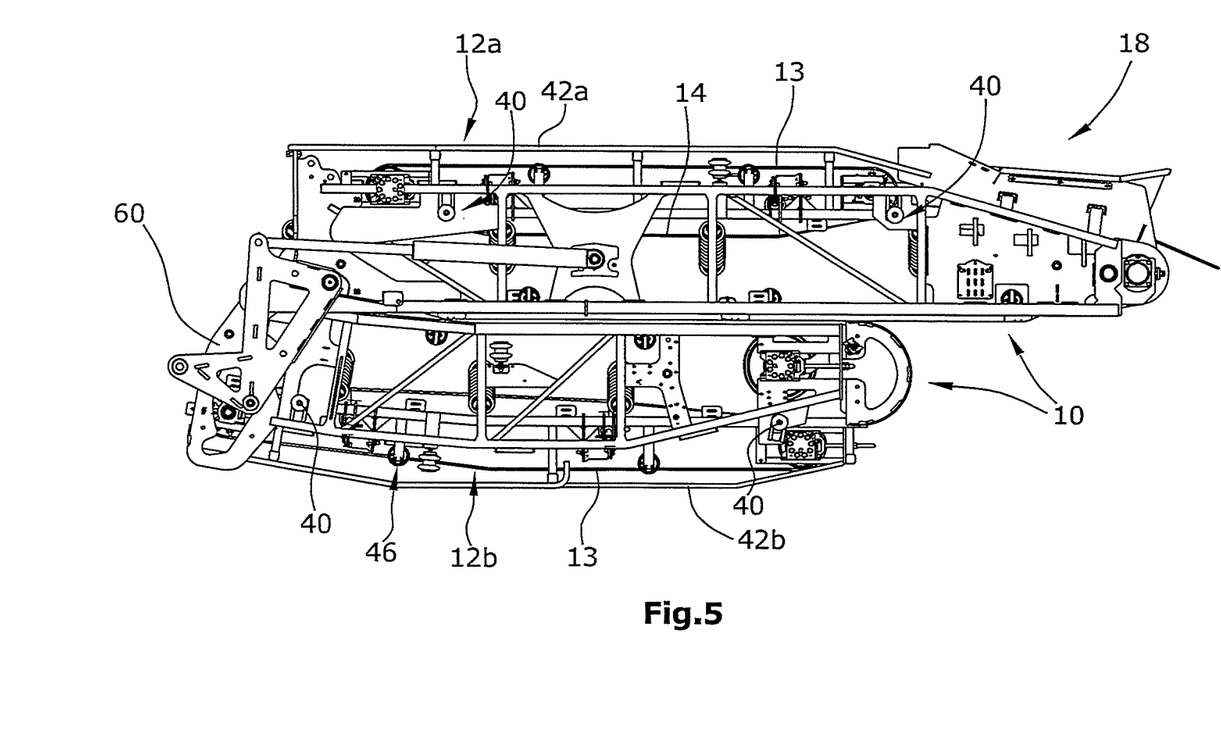

As can be inferred from FIG. 5, the front section of the conveying device 18 can be folded downwards and locked, for transport purposes, in an end position inferable from FIG. 5. An example of a swivel gear 60 suitable for this purpose has, in principle, been described in EP 2 113 613 A (U.S. Pat. No. 8,424,666). It is preferably intended for the folded front section of the conveying device 18 to have its own cover belt 12b. Such segmentation of the cover belt 12a, 12b arranged above the transport belt 10 enables the folding possibility of the transport belt 10 to be maintained.

Figure 6:
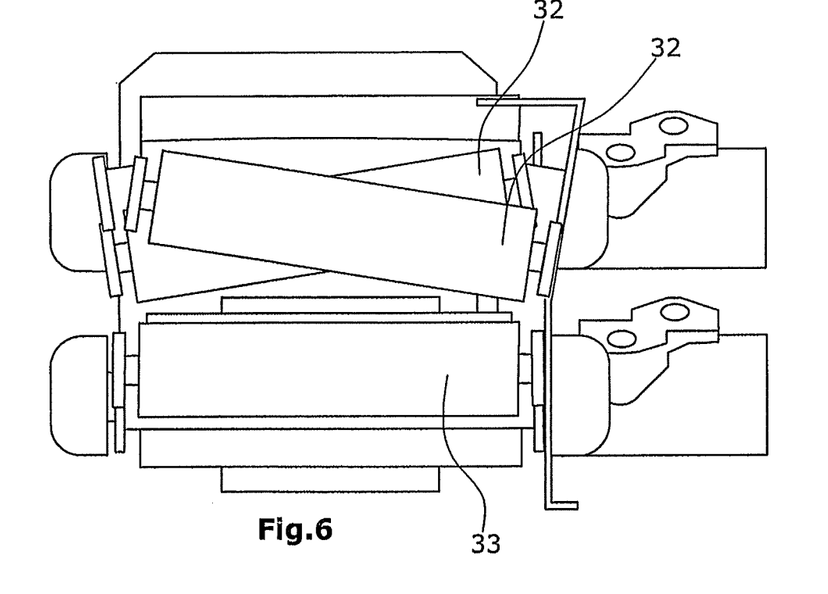

FIG. 6 shows an alternative embodiment for the support rollers 32 of the upper strand 15 of the transport belt 10.

In this embodiment, a dual arrangement of rectilinear support rollers 32 is used which are arranged immediately behind one another in conveying direction 30 and together enable a V-shaped support, in conveying direction 30, of the upper strand 15 of the transport belt 10.

The transport and cover belts 10, 12a, 12b feature a profile on the surfaces facing the milled-off material 3 which minimize the amount of slip on the transport surface.

Figure 7:
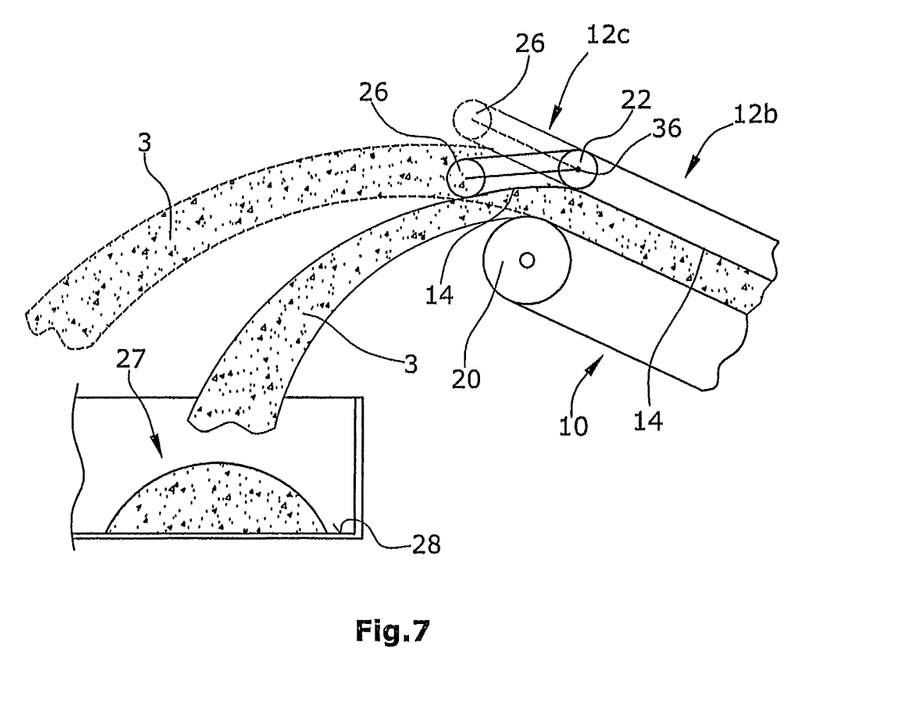

FIG. 7 shows an embodiment in which a projecting section 12c of the cover belt 12b is pivotable in order to adjust the parabolic trajectory of the milled-off stream of material 3 to a specified point of discharge 27.

The upper cover belt 12b is extended, at the discharge end 11, beyond the deflection roller 22 and comprises, at a distance from the deflection roller 22, an additional deflection roller 26 which, in the direction towards the transport belt 10, is pivotable about a normally horizontal axis 36 preferably coaxially to the axis of the deflection roller 22.

It is understood that, notwithstanding the illustration in FIG. 7, the section 12c projecting vis-à-vis the transport belt 10 may also be longer in such a fashion that the lower strand 14 of the cover belt 12b, 12c can wrap around the transport belt 10, in the area of the deflection roller 20, for example, in the shape of an arc of up to 90°.

As depicted in FIG. 7 in dashed lines, the deflection roller 26 may also be brought into a position in which the pivotable section 12c of the cover belt 12b extends in a rectilinear elongation of the remaining cover belt 12b. In this case, a different parabolic trajectory results for the milled-off material 3 that is depicted in dashed lines in FIG. 7.

It is thus possible, by means of the pivoting position of the projecting section 12c, to determine the position of the point of discharge 27 on a loading surface 28 of a transport vehicle.

What is claimed is:

1. A construction machine for working ground surfaces, comprising:
   a machine frame;
   a milling drum supported from the machine frame;
   a plurality of wheels or tracks for supporting the machine frame from the ground surface so that the construction machine is a self-propelled mobile construction machine having a direction of travel during working operation;
   a conveyor system arranged to accept milled-off material from the milling drum during working operation, and to unload the milled-off material in a conveying direction from a discharge end of the conveyor system along a parabolic trajectory onto a discharge point, the conveyor system including:
   at least one continuously revolving transport belt having a length and having a transport belt discharge end; and
   at least one continuously revolving cover belt arranged above at least a last section of the transport belt in the conveying direction adjacent the transport belt discharge end, the cover belt extending essentially parallel to the length of the transport belt, the cover belt being configured to rest against milled-off material carried by the transport belt in at least a portion of the length of the transport belt to aid in controlling the parabolic trajectory of the milled-off material to the discharge point during working operation of the self-propelled mobile construction machine;
   wherein the transport belt includes the last section and another section, and the cover belt covers only the last section.

2. The construction machine of claim 1, wherein:
at least a portion of the conveyor system is arranged to pivot relative to the machine frame such that an inclination of the conveyor system and/or a lateral alignment of the conveyor system relative to the machine frame is adjustable.

3. The construction machine of claim 1, wherein:
the cover belt is adjustable in height relative to the transport belt.

4. The construction machine of claim 3, wherein:
the cover belt is pre-tensioned toward the transport belt.

5. The construction machine of claim 1, wherein:
the at least one continuously revolving cover belt comprises two successive cover belts arranged above the transport belt.

6. The construction machine of claim 1, wherein:
the transport belt includes an upper strand and a lower strand, and support rollers for the upper strand, the support rollers supporting the upper strand such as to form a transport channel having a concave cross-section on the upper strand of the transport belt.

7. The construction machine of claim 6, wherein:
the support rollers for the upper strand of the transport belt each comprise multiple roller segments coupled to one another in an articulated fashion.

8. The construction machine of claim 1, wherein:
the at least one cover belt includes an upper strand and a lower strand, and support rollers for the lower strand, the support rollers allowing a flexible adjustment of a cross-sectional shape of the lower strand of the cover belt so that the lower strand contacts a quantity of milled-off material present on the transport belt.

9. The construction machine of claim 8, wherein:
the support rollers for the lower strand of the cover belt have an articulated connection to a side frame of the conveyor system, and the support rollers are resiliently pre-tensioned toward the transport belt.

10. The construction machine of claim 8, wherein:
the support rollers for the lower strand of the cover belt each comprise multiple roller segments coupled to one another in an articulated fashion.

11. The construction machine of claim 1, wherein:
the cover belt has an inlet end and an outlet end;
the outlet end of the cover belt diverges from the transport belt in a conveying direction; and
the inlet end of the cover belt converges toward the transport belt in the conveying direction.

12. The construction machine of claim 1, wherein:
the transport belt is foldable, the last section being pivotable downwards relative to the other section to a transport position.

13. The construction machine of claim 12, wherein:
the cover belt is pivotable downwards with the last section of the transport belt relative to the other section of the transport belt.

14. A construction machine for working ground surfaces, comprising:
   a machine frame;
   a milling drum supported from the machine frame; and
   a conveyor system arranged to accept milled-off material from the milling drum during a working operation, and to unload the milled-off material in a conveying direction from a discharge end of the conveyor system along a parabolic trajectory onto a discharge point, the conveyor system including:
at least one continuously revolving transport belt having a length and having a transport belt discharge end; and
at least one continuously revolving cover belt arranged above at least a last section of the transport belt in the conveying direction adjacent the transport belt discharge end, the cover belt extending essentially parallel to the length of the transport belt, the cover belt being configured to rest against milled-off material carried by the transport belt in at least a portion of the length of the transport belt;
wherein the cover belt includes a projecting section projecting beyond the transport belt discharge end, the projecting section being pivotable relative to the transport belt about an axis transverse to the length of the transport belt and generally parallel to a width of the transport belt.

15. The construction machine of claim 1, wherein:
the transport belt includes a last transport belt deflection roller in the conveying direction;
the at least one cover belt includes a last cover belt deflection roller in the conveying direction; and
one of the last transport belt deflection roller and the last cover belt deflection roller is pivotable relative to the other.

16. A method of operating a self-propelled construction machine including a milling drum, the method comprising:
(a) milling off material from a ground surface with the milling drum as the construction machine moves across the ground surface;
(b) accepting milled-off material from the milling drum on a conveyor as the construction machine moves across the ground surface;
(c) transporting the milled-off material between a lower transport belt and an upper cover belt of the conveyor along at least a part of a length of the lower transport belt to a discharge end of the conveyor as the construction machine moves across the ground surface, the upper cover belt covering only a last section of the transport belt adjacent the discharge end; and
(d) discharging the milled-off material from the discharge end of the conveyor along a parabolic trajectory to a point of discharge as the construction machine moves across the ground surface.

17. The method of claim 16, further comprising:
resiliently pre-tensioning at least a part of the cover belt towards the transport belt such that the cover belt contacts the milled-off material on the transport belt along at least part of the transport belt.

18. The method of claim 16, further comprising:
folding the last section of the transport belt to a transport position and locking the last section of the transport belt in the transport position.

19. The method of claim 18, further comprising:
pivoting the cover belt downwards with the last section of the transport belt.

20. The method of claim 16, wherein:
in step (c), the lower transport belt defines a transport channel carrying the milled-off material, and a lower strand of the upper cover belt is pressed against the milled-off material on the lower transport belt so that a cross-sectional shape of the lower strand of the upper cover belt varies from a convex to a concave shape depending on a quantity of milled-off material carried on the lower transport belt.

21. The method of claim 16, further comprising:
pivoting the conveyor relative to a machine frame of the construction machine such that an inclination of the conveyor and/or a lateral alignment of the conveyor relative to the machine frame is adjusted as the construction machine moves across the ground surface.

22. A method of operating a construction machine including a milling drum, the method comprising:
(a) milling off material from a ground surface with the milling drum;
(b) accepting milled-off material from the milling drum on a conveyor;
(c) transporting the milled-off material between a lower transport belt and an upper cover belt of the conveyor along at least a part of a length of the lower transport belt to a discharge end of the conveyor; and
(d) discharging the milled-off material from the discharge end of the conveyor along a parabolic trajectory to a point of discharge;
wherein a projecting section of the upper cover belt projects beyond a discharge end of the lower transport belt; and
wherein the method further includes pivoting the projecting section and thereby adjusting the parabolic trajectory of the milled-off material.

* * * * *